Patented June 18, 1946

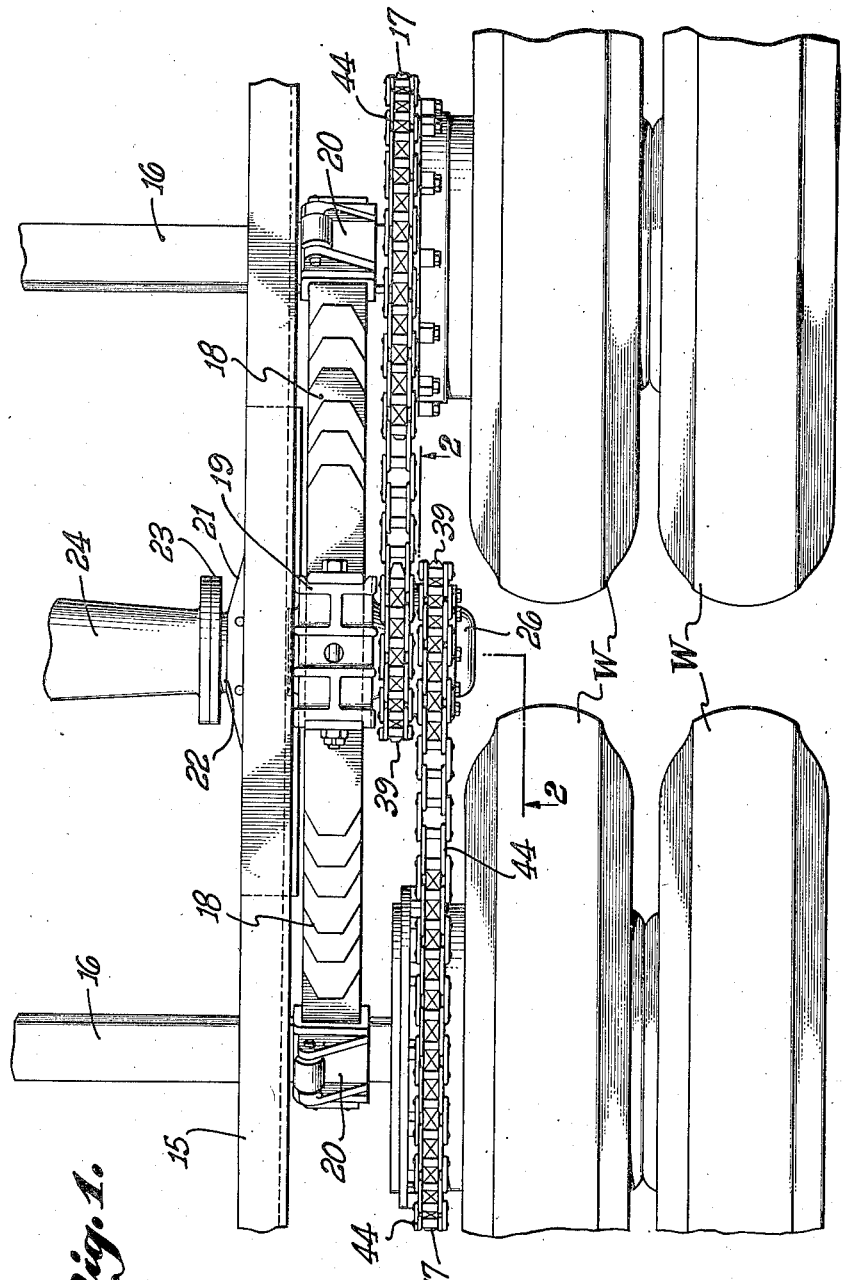

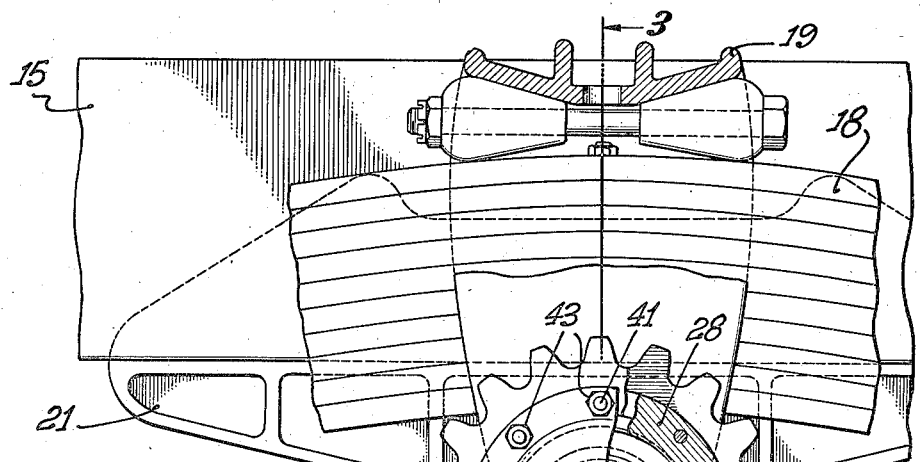
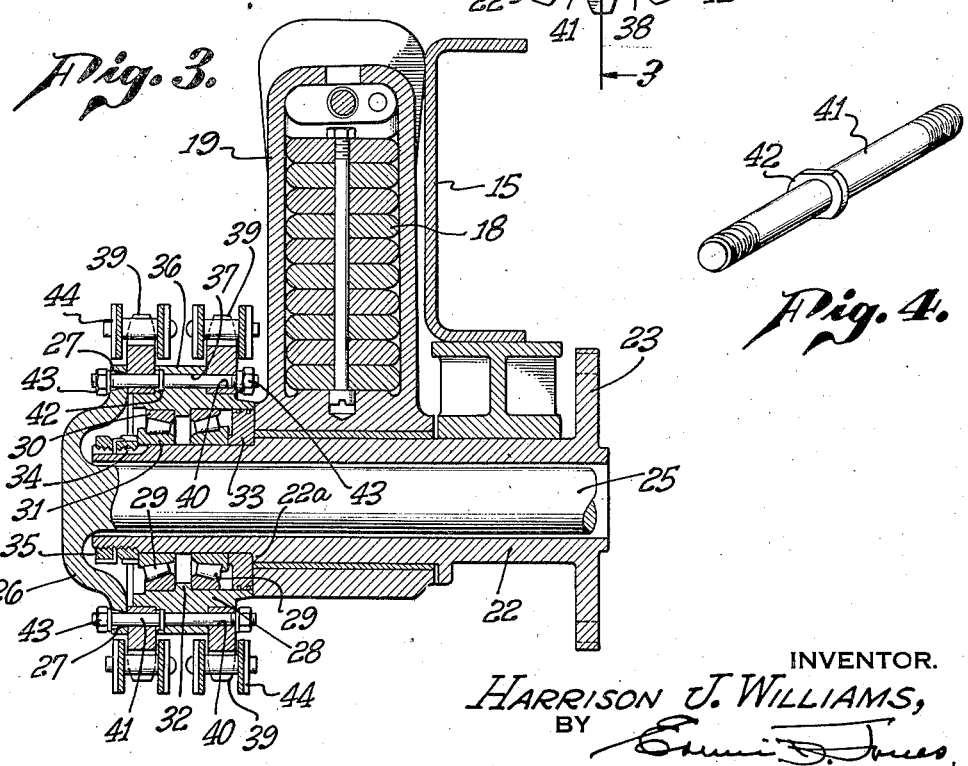

2,402,266

UNITED STATES PATENT OFFICE 2,402,266

SPROCKET AND JACKSHAFT CONNECTION FOR MOTOR VEHICLES

Harrison J. Williams, Garvey, Calif., assignor to C. B. Equipment Co., Los Angeles, Calif., a co-partnership Application July 19, 1944, Serial No. 545,687

2 Claims. (Cl. 180—22)

My invention relates to motor vehicles of the six wheel type which include a bogie unit having the four wheels thereof driven by sprockets and chains. More particularly it refers to the driving connections between the jackshaft and the sprockets thereof.

Jackshaft hubs on chain drives are essentially modifications of conventional wheel hubs, that is the jackshaft flange is secured to the hub through a circular set of studs, and then the sprockets are secured to the flange by a circular set of bolts similar to the mounting of a wheel. For the purpose of added strength and to achieve maximum driving torque or leverage the jackshaft bolt circle should be as large as possible, while on the other hand, the bolt circle for the sprockets should be as small as possible so as to be able to decrease the number of teeth on the sprockets and thereby obtain a lower gear ratio when required.

It is a purpose of my invention to provide a sprocket and jackshaft driving connection which is characterized by the employment of a single set of bolts which is common to both the jackshaft flange and the sprocket or sprockets, and by means of which it is possible to obtain a large bolt circle for the jackshaft flange and a small bolt circle for the sprocket or sprockets to attain the advantages above recited, while at the same time retaining the inherent advantages of a plate type of demountable sprocket.

I will describe only one form of sprocket jackshaft connection for motor vehicles embodying my invention and will then point out the novel features thereof in claims.

In the accompanying drawings:

Fig. 1 is a view showing in fragmentary plan a motor vehicle having incorporated therein one form of sprocket and jackshaft connection embodying my invention.

Fig. 2 is an enlarged fragmentary vertical sectional view taken on the line 2—2 of Fig. 1, with parts thereof broken away and in sections.

Fig. 3 is a vertical sectional view taken on the line 3—3 of Fig. 2.

Fig. 4 is a detailed perspective view of one of the stud bolts shown in the preceding view.

Similar reference characters refer to similar parts in each of the several views.

Referring specifically to the accompanying drawings, my invention is shown incorporated in a bogie unit constituting a part of a six wheel motor vehicle, and wherein the four wheels of the bogie unit constitute the traction or driving wheels of the vehicle. The bogie unit includes a frame made up in part of two side members 15, only one of which has been illustrated. Likewise, only those parts constituting one half of the bogie unit have been illustrated in Fig. 1, the other half of the unit being a structural duplication.

The four wheels W of the bogie unit, two on each side of the vehicle frame, are carried by two axles 16 (Fig. 1), and associated with each of the wheels is a driven sprocket 17. The frame members 15 are supported on the axles 16 by a multiple leaf spring 18 the medial portion of which is secured in a saddle 19, while its ends engage within stirrups 20 secured to the axles.

Secured to the frame member 15 is a bracket 21 in which is held a tubular trunnion or spindle 22 having its inner end formed with a flange 23 which is bolted to the confronting end of the differential housing 24. A jackshaft axle 25 extends through the trunnion 22 and the housing 24 where it is connected to the differential mechanism contained in the housing.

The other end of the axle 25 projects from the trunnion 22 and is provided with a flange 26 having its marginal edge provided with a circle of bolt holes 27. A hub 28 is journalled on the trunnion 22 by suitable nonfriction members which, in the present instance, comprise roller bearings 29 interposed between outer races 30 and inner races 31. The outer races are maintained in spaced relationship by an inner rib 32 formed on the interior of the hub 28, and the inner races are held against axial movement on the trunnion 22 by a ring 33 abutting a suitable shoulder 22a on the trunnion and a nut 34 threaded on the outer end of the trunnion and engaged by a lock nut 35.

The hub 28 is formed on its outer periphery with an annular rib 36 bored transversely at regular spaced intervals circumferentially to form a circular series of bolt holes 37. As best shown in Fig. 2, the outer side or face of the rib 36 is milled to form an annular groove 38 into which the bolt holes 37 lead.

Arranged on opposite sides of the rib 36 so as to have a removable fit on the hub 28 are a pair of driving sprockets 39, with each sprocket bored transversely adjacent the inner periphery thereof and at regularly spaced intervals circumferentially to form a circle of bolt holes 40.

As will be clear from a consideration of Fig. 3, the holes 27 of the flange 26 register with the holes 40 of the sprockets 39, and the latter, in turn, register with the holes 37 of the rib 36. Thus is provided a bolt hole circle common to flange 26 and the sprockets 39 so that suitable bolts can be extended first through the flange then through the outer sprocket 39 and the rib 36, and finally through the inner sprocket 39 to secure the flange to the sprockets and the latter to the hub 28, and to thereby provide a rotational driving connection between the jackshaft 25 and the sprockets so that the former can serve to drive the latter.

The bolts employed in the present instance are stud bolts, and each bolt 41 is formed with a projection 42 (Fig. 4) which is of such size as to be extended into the groove 38 and of such contour that once within the groove the bolt cannot be turned. To achieve this latter function the projection is flattened at two sides, as illustrated. Upon insertion of the bolt into the elements of the structure the projection 42 abuts the rib 36 to limit movement of the bolt inwardly to a position in which its threaded ends project respectively from the inner side of the inner sprocket 39 and the outer side of the flange 26, so that nuts 43 may now be applied to the bolt ends to secure the elements of the structure together. Thus with the several bolts and nuts applied the flange 26 is fixed to the outer sprocket 39, the latter in turn fixed to the rib 36, and the rib fixed to the inner sprocket 39, and all for rotation together.

As will be understood from a consideration of Fig. 1, the wheels W are adapted to be driven by the jackshaft 25 through my aforedescribed driving connection with the driving sprockets 39, and from the latter through chains 44 trained about the sprockets 39 and the driven sprockets 17. By virtue of the fact that the bolt circle for the flange 26 is situated at the extreme outer edge of the flange, it is made as large as possible for any given diameter of flange so that maximum driving leverage or torque is exerted by the flange on the driving sprockets 39. By locating the bolt circle for the driving sprockets adjacent their inner peripheries, it is made as small as possible and thus sprockets with a minimum number of teeth can be employed to attain the lowest gear ratio possible. Manifestly these two advantages are achieved only through making the bolt circles for the flange and sprockets coincident or common one to the other.

Although I have herein shown and described my driving connection as applied to a pair of driving sprockets, it is to be understood that it is likewise applicable to a single driving sprocket such as incorporated in a motor vehicle having a two wheel chain drive, and that other changes and modifications may be made herein without departing from the spirit of my invention and the spirit and scope of the appended claims.

I claim:

1. In combination: a spindle; a jackshaft projecting from said spindle and having a flange fixed thereto; a hub journalled on said spindle and provided with an annular rib having an annular groove in that side facing said flange; a pair of plate sprockets on said hub at opposite sides of said rib; stud bolts extending through said flange, said sprockets, and said rib; projections on said stud bolts engageable with said rib within said groove for securing said stud bolts against rotation in said rib and defining the position of said bolts axially within said rib so that their threaded ends project from the rib and the flange to permit the application of nuts thereto.

2. The combination of a spindle adapted to be secured at its inner end to a vehicle frame; a hub rotatably mounted on said spindle and having an annular projecting rib on its periphery; a pair of plate sprockets seating respectively on the inboard and outboard sides of said rib; through-bolts inserted through said sprockets, and said rib from the outboard side, and projecting beyond the inboard sprocket to receive clamping nuts, said through-bolts and the outboard side of said rib having coordinated means for holding said bolts fixed against rotation on their axes; a jackshaft inserted into said spindle from its outer end and having a flange with bolt holes fitting over the outer ends of said through-bolts; and clamping nuts on the outboard ends of said through-bolts, for clamping the flange against the outboard sprocket.

HARRISON J. WILLIAMS.